United States Patent
Harris et al.

(10) Patent No.: US 8,583,320 B2
(45) Date of Patent: Nov. 12, 2013

(54) APPARATUS AND METHOD FOR AUTOMATED VEHICLE ROADSIDE ASSISTANCE

(75) Inventors: Frederick Miles Harris, San Clemente, CA (US); Deepak Kumar Srinivasan, Fremont, CA (US); Philip James Swift, Novato, CA (US); Paul David Sykes, Bainbridge Island, WA (US)

(73) Assignee: Esurance Insurance Services, Inc., San Francisco, CA (US)

( * ) Notice: Subject to any disclaimer, the term of this patent is extended or adjusted under 35 U.S.C. 154(b) by 963 days.

(21) Appl. No.: 12/493,103

(22) Filed: Jun. 26, 2009

(65) Prior Publication Data

US 2010/0332133 A1 Dec. 30, 2010

(51) Int. Cl.
*G06F 17/00* (2006.01)
*G08G 1/123* (2006.01)
*G08G 1/137* (2006.01)
*G06Q 40/00* (2012.01)

(52) U.S. Cl.
USPC ........... 701/36; 701/29.3; 701/29.6; 701/414; 701/455; 701/516; 340/902; 340/995.12; 340/995.25; 705/1.1; 705/4

(58) Field of Classification Search
USPC ............. 701/1, 29, 31, 35, 36, 200, 206, 207, 701/208, 211, 213, 300, 117, 29.1, 29.2, 701/29.3, 29.4, 29.6, 31.4, 31.5, 32.3, 32.4, 701/32.7, 33.2, 34.2, 400, 408, 409, 410, 701/411, 412, 414, 418, 422, 423, 428, 430, 701/431, 445, 450, 451, 454, 455, 457, 465, 701/466, 467, 468, 515, 516, 519, 532, 537, 701/538, 302; 705/1.1, 4; 340/901, 902, 340/903, 988, 989, 990, 991, 995.1, 995.12, 340/995.14, 995.25, 995.27, 995.13, 340/995.15, 995.19
See application file for complete search history.

(56) References Cited

U.S. PATENT DOCUMENTS

| 5,334,974 A | 8/1994 | Simms et al. |
| 5,890,061 A | 3/1999 | Timm et al. |
| 6,539,301 B1 * | 3/2003 | Shirk et al. .................... 701/200 |
| 2003/0109244 A1 * | 6/2003 | Tendler ........................ 455/345 |
| 2004/0198441 A1 | 10/2004 | Cooper et al. |
| 2005/0075767 A1 * | 4/2005 | Dasti et al. ...................... 701/29 |
| 2011/0143670 A1 * | 6/2011 | Farrell et al. ................. 455/41.2 |

OTHER PUBLICATIONS

PCT/US10/38292, Esurance, Inc. International Search Report (Aug. 5, 2010).

* cited by examiner

*Primary Examiner* — Thomas Tarcza
*Assistant Examiner* — Edward Pipala
(74) *Attorney, Agent, or Firm* — McDermott Will & Emery LLP

(57) ABSTRACT

A computer readable storage medium includes executable instructions to receive from a mobile device a request regarding a stranded vehicle. The request is processed to determine the location of the stranded vehicle. Additional information regarding the stranded vehicle may be retrieved. The location of the stranded vehicle and the additional information may be communicated as a dispatch request. The location of the stranded vehicle relative to a dispatched vehicle is delivered to the mobile device.

10 Claims, 5 Drawing Sheets

APPARATUS AND METHOD FOR AUTOMATED VEHICLE ROADSIDE ASSISTANCE

FIELD OF THE INVENTION

This invention relates generally to vehicle roadside assistance. More particularly, this invention relates to a vehicle roadside assistance apparatus and method for automatically provisioning a dispatched vehicle to a stranded vehicle.

BACKGROUND OF THE INVENTION

Vehicle roadside assistance is typically used to provide emergency services to vehicle owners experiencing problems that have rendered their vehicles inoperable. In the case of a vehicle breakdown or an emergency, a vehicle owner is typically required to call a roadside assistance coverage center such as the vehicle owner's insurance company to request roadside assistance. The vehicle owner is subsequently directed to a service representative at a vehicle dispatch center to process the request. Upon receiving the request, the vehicle dispatch center selects a vehicle to dispatch to the vehicle owner by identifying the nearest vehicles with respect to a given address associated with the vehicle requiring roadside assistance. Thereafter, a dispatched vehicle is directed to the stranded vehicle.

With the widespread use of mobile devices, vehicle owners are able to conveniently place requests for roadside assistance from their vehicle. It would be desirable to develop a technique by which roadside assistance can be automatically procured by the vehicle owner via the mobile device. It would also be desirable to develop a technique by which a vehicle can be automatically provisioned to the vehicle owner using key inputs at a mobile device.

SUMMARY OF THE INVENTION

A computer readable storage medium includes executable instructions to receive from a mobile device a request regarding a stranded vehicle. The request is processed to determine the location of the stranded vehicle. Additional information regarding the stranded vehicle may be retrieved. The location of the stranded vehicle and the additional information may be communicated as a dispatch request. The location of the stranded vehicle relative to a dispatched vehicle is delivered to the mobile device.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
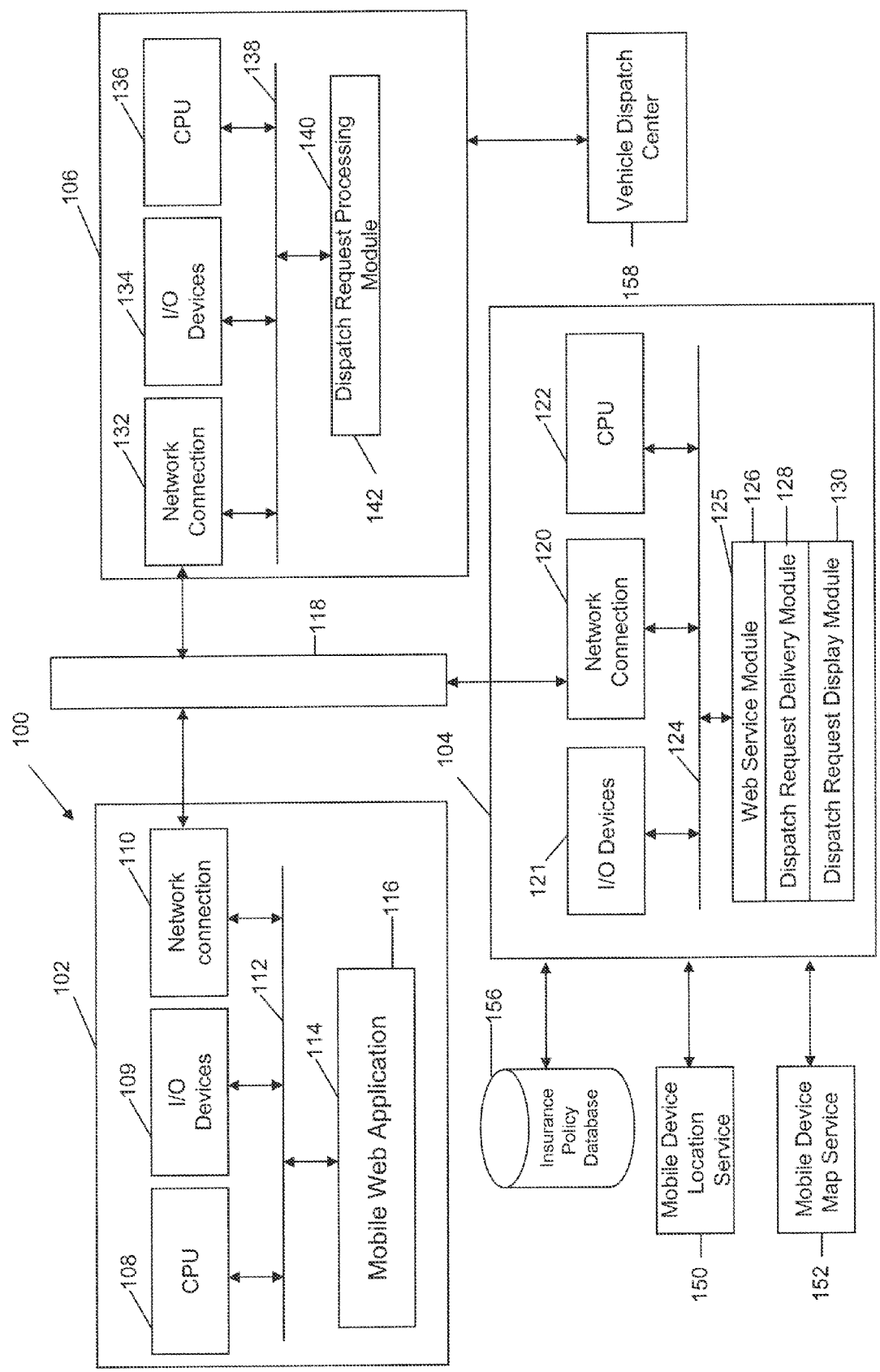
FIG. 1 is an exemplary illustration of the components of an automatic roadside assistance system, in accordance with one embodiment of the present invention.

FIG. 1 is an exemplary illustration of the components of an automatic roadside assistance system 100 configured in accordance with one embodiment of the present invention. The system 100 includes a mobile device 102 connected to a server computer 104 and a remote computer 106 via a communication channel 118, which may be any wired or wireless communication channel. The mobile device 102 includes standard components, such as a central processing unit 108, input/output devices 109 and a network connection circuit 110, which are linked by a bus 112. The network connection circuit 110 provides connectivity to the communication channel 118, thereby allowing the mobile device 102 to operate in a networked environment. In one embodiment, the mobile device 102 may include, but is not limited to, a cellular phone, a handheld computer, a personal digital assistant or a smart phone. The input/output devices 109 may include a keyboard and/or display screen that displays one or more graphical user interfaces for providing a user with access to various system objects and for conveying information to the user. A mobile web application 116 is stored in a memory 114, which is connected to the bus 112. In one embodiment, and as will be discussed in greater detail below, the mobile web application 116 includes executable instructions to receive a request regarding a stranded vehicle from the mobile device 102.

The server computer 104 includes standard components, such as a network connection circuit 120, input/output devices 121 and a central processing unit 122, which are linked by a bus 124. In one embodiment, the server computer 104 is configured to provide roadside assistance services. The server computer 104 includes a web service module 126 stored in a memory 125, which is connected to the bus 124. The web service module 126 includes executable instructions to process the request from the mobile web application 116 and determine the location of the stranded vehicle. The server computer 104 also includes a dispatch request delivery module 128 and a dispatch request display module 130. The dispatch request delivery module 128 includes executable instructions to deliver a dispatch request to the remote computer 106. The dispatch request display module 130 includes executable instructions to route a graphical map of the location of the stranded vehicle relative to a dispatched vehicle for display on the mobile device 102.

The remote computer 106 also includes standard components, such as a network connection circuit 132, input/output devices 134 and a central processing unit 136, which are linked via a bus 138. The remote computer 106 includes a dispatch request processing module 142 stored in a memory 140, which is connected to the bus 138. The dispatch request processing module 142 includes executable instructions to process the dispatch request from the dispatch request delivery module 128. In one embodiment, a graphical map of the location of the stranded vehicle relative to the dispatched vehicle is delivered to the server computer 104.

It should also be noted that the executable modules stored in memory units 114, 125 and 140 are exemplary. Additional modules, such as an operating system module or GUI module may also be included. It should be appreciated that the functions of the modules may be combined. In addition, the functions of the modules may be distributed across the network 100 in any number of ways. The operations performed by the executable modules in memory units 114, 125 and 140 are discussed in greater detail below.

Initially, a request regarding a stranded vehicle is received on the mobile device 102. A variety of techniques may be used to receive the request. In one embodiment, the mobile web application 116 in the mobile device 102 includes executable instructions to receive the request. The mobile web application 116 may include, for example, a Rich Internet Application (RIA) utilizing Silverlight or Active X configured to receive the request via a graphical user interface provided by the mobile device 102.

The web service module 126 includes executable instructions to receive the request from the mobile web application 116. In one embodiment, the web service module 126 includes executable instructions to communicate the request to a mobile device location service 150, such as AT&T or Sprint, associated with the mobile device 102 to determine the location of the stranded vehicle. In a particular embodiment, the web service module 126 includes executable instructions to display the location as a set of GPS coordinates on the display screen of the mobile device 102. In certain embodiments, the web service module 126 also includes executable instructions to pass the set of GPS coordinates as input parameters to a mobile location mapping service 152. The mobile location mapping service 152 may include, for example, a mapping service such as Microsoft's Virtual Earth™. The web service module 126 further includes executable instructions to receive a graphical map of the location of the stranded vehicle from the mobile location mapping service 152 and route the graphical map for display on the display screen of the mobile device 102.

Figure 2:
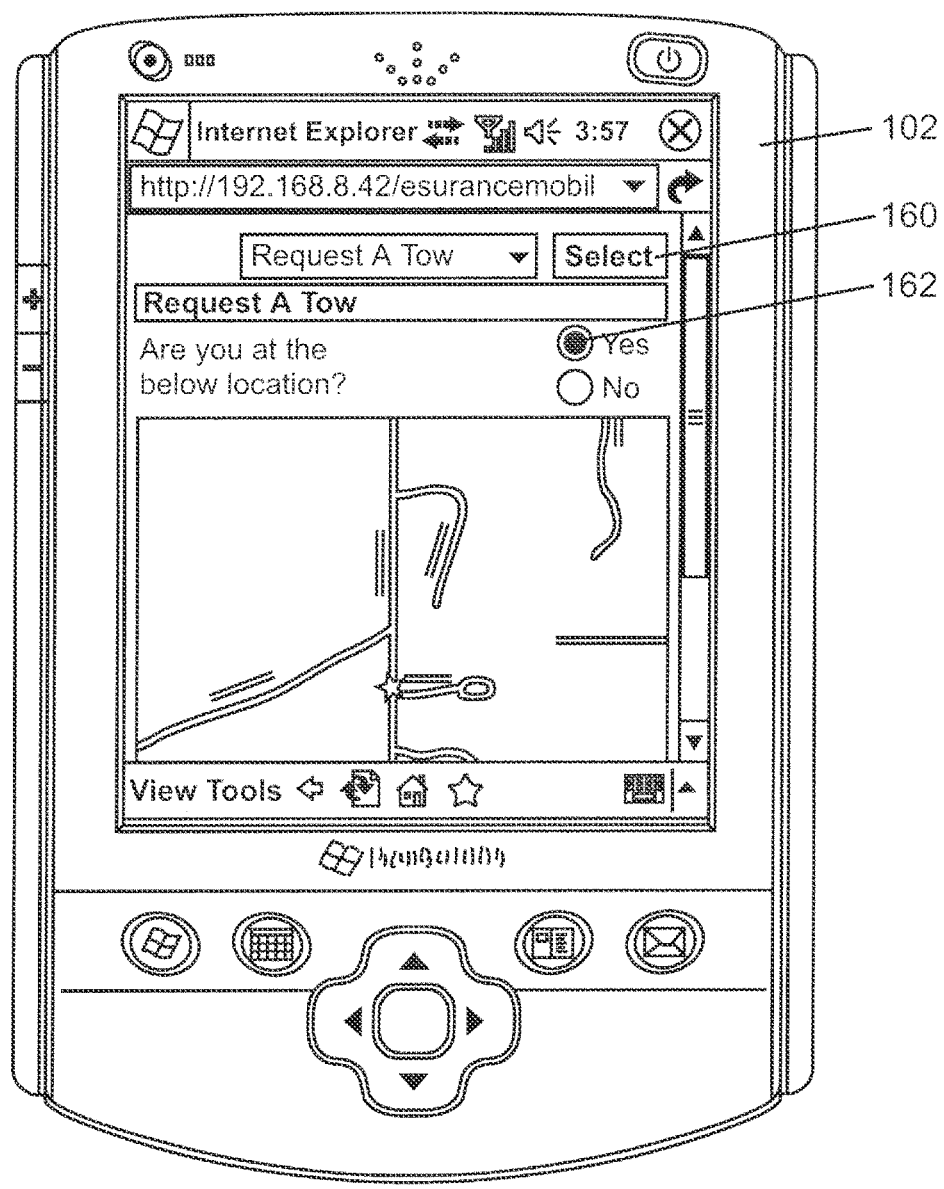
FIG. 2 illustrates an exemplary graphical user interface (GUI) for receiving on a mobile device a request regarding a stranded vehicle, in accordance with one embodiment of the present invention.

FIG. 2 illustrates an exemplary graphical user interface (GUI) for receiving a request regarding a stranded vehicle on the mobile device 102, in accordance with one embodiment of the present invention. In one embodiment, a user requests roadside assistance by activating a URL, http://109.168.8.42/esurancemobile.com and selecting an option, "Request a Tow" 160 on the display screen of the mobile device 102. As illustrated, the location of the stranded vehicle is displayed as a set of Global Positioning System (GPS) coordinates on the mobile device 102. As further illustrated in FIG. 2, the user may acknowledge the accuracy of the location displayed on the mobile device 102 by selecting a radio button choice 162 on the display screen of the mobile device 102.

Returning to FIG. 1, in another embodiment, the web service module 126 includes executable instructions to receive additional information regarding the stranded vehicle from the mobile web application 116. In one embodiment, the additional information may be displayed as a plurality of questions related to the stranded vehicle on the display screen of the mobile device 102. The additional information may include, for example, the current status of the stranded vehicle, the current coverage limits on the vehicle and details regarding the user's vehicle insurance policy. In an alternate embodiment, the web service module 126 may include executable instructions to obtain the additional information regarding the current coverage limits on the vehicle and the user's vehicle insurance policy directly from an Insurance Policy Database 156 connected to the server computer 104.

The dispatch request delivery module 128 includes executable instructions to receive the location of the stranded vehicle and the additional information from the web service module 126 and deliver the location and the additional information as a dispatch request to the remote computer 106. In one embodiment, the dispatch request delivery module 128 includes executable instructions to deliver the dispatch request via a dispatch request application programming interface (API) call to the remote computer 106.

The dispatch request processing module 142 in the remote computer 106 includes executable instructions to receive the dispatch request from the server computer 104 and communicate the dispatch request to a vehicle dispatch center 158 via the dispatch request API. The dispatch request is received by an appropriate vehicle provider in the vehicle dispatch center 158. The dispatch request processing module 142 further includes executable instructions to receive a dispatch request result from the vehicle dispatch center 158, via the dispatch request API. The dispatch request result may include information regarding a dispatched vehicle provisioned for the user, such as the location of the dispatched vehicle, the estimated time of arrival (ETA) of the dispatched vehicle, etc. In one embodiment, the dispatch request processing module 142 further includes executable instructions to generate a graphical map of the location of the stranded vehicle relative to the dispatched vehicle. The graphical map may be delivered to the dispatch request display module 130 in the server computer 104.

The dispatch request display module 130 includes executable instructions to route the graphical map of the location of the stranded vehicle relative to the dispatched vehicle for display on the mobile device 102. In certain embodiments, the mobile web application 116 in the mobile device 102 includes executable instructions to periodically poll the server computer 104 to get real-time location information updates associated with the dispatched vehicle relative to the stranded vehicle. Alternately, the server computer 104 can periodically push this information to the mobile device 102. The dispatch request display module 130 further includes executable instructions to display an updated graphical map of the location updates on the mobile device 102. In another embodiment, the dispatch request display module 130 includes executable instructions to display real-time location updates associated with the dispatched vehicle relative to the stranded vehicle via short message service (SMS) or email messages on the mobile device 102.

Figure 3:
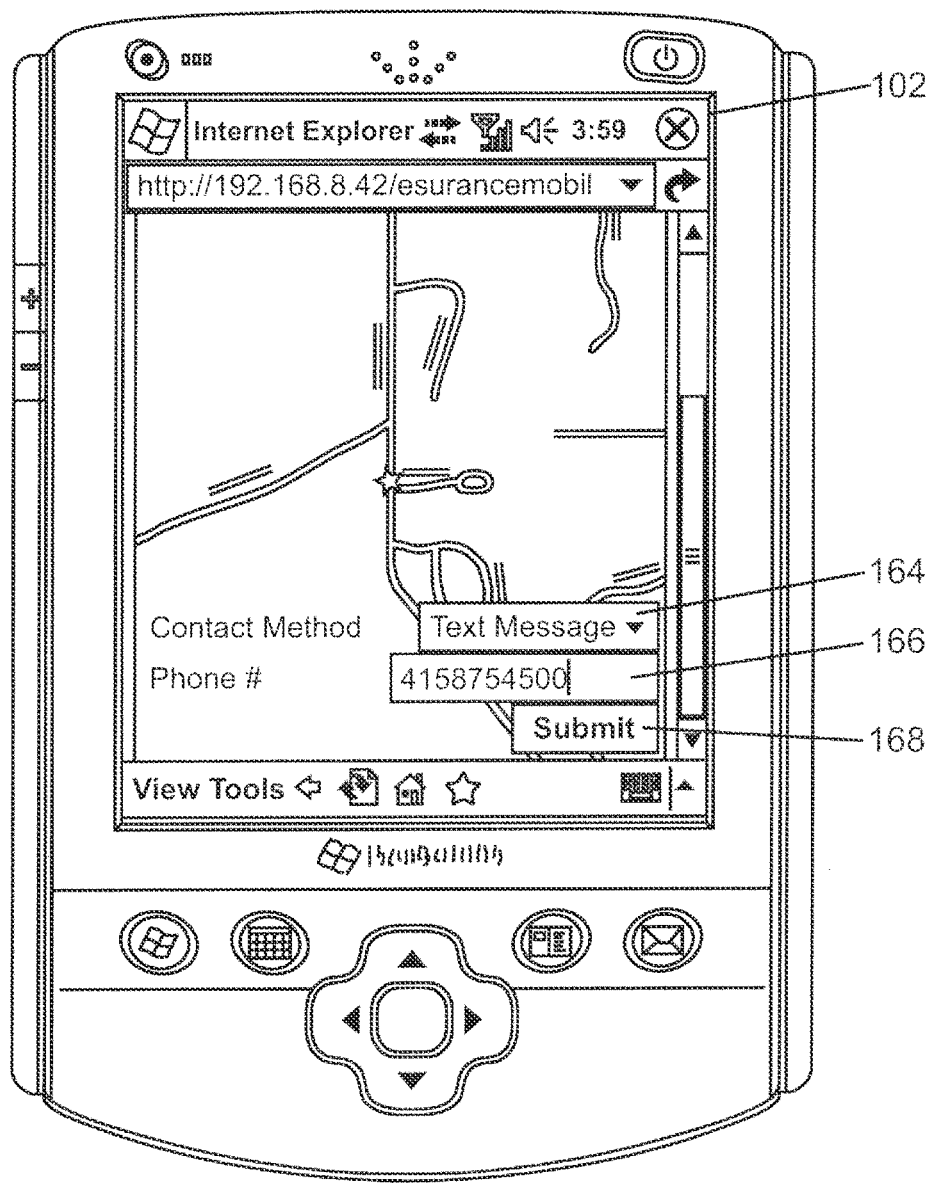
FIG. 3 illustrates an exemplary graphical user interface (GUI) for making a request on a mobile device to receive location updates regarding a dispatched vehicle, in accordance with one embodiment of the present invention.
Figure 4:
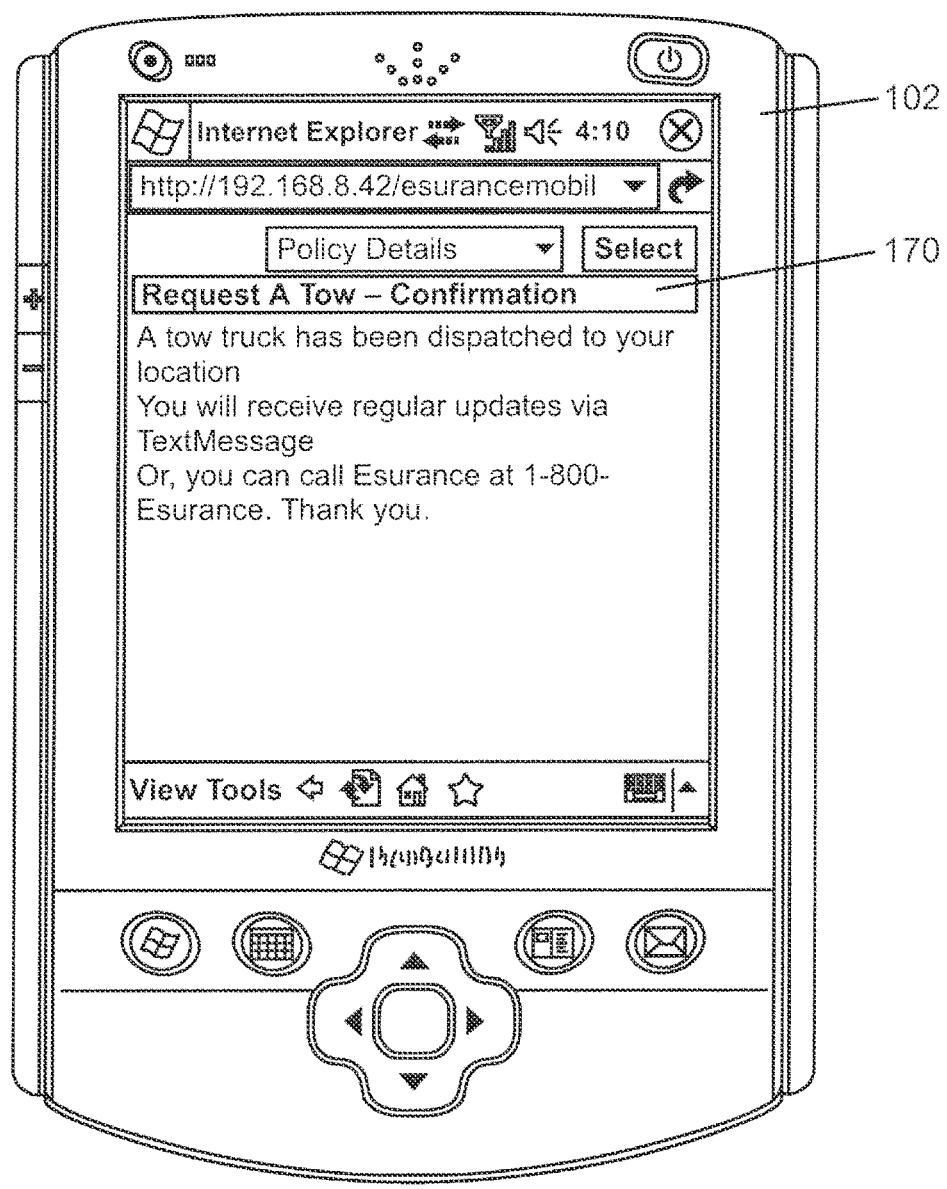
FIG. 4 illustrates an exemplary graphical user interface (GUI) for displaying details of a dispatch request on the mobile device, in accordance with one embodiment of the present invention.

FIG. 3 illustrates an exemplary graphical user interface (GUI) for making a request to receive location updates regarding a dispatched vehicle on the mobile device 102, in accordance with one embodiment of the present invention. As illustrated, the user selects a type of contact method, "Text message", 164 and enters a contact number in a data field 166. Upon selecting the submit button 168, a graphical user interface as illustrated in FIG. 4 is displayed to the user. As illustrated, a dispatch request confirmation 170 including details of the dispatch request may be displayed on the display screen of the mobile device 102.

Figure 5:
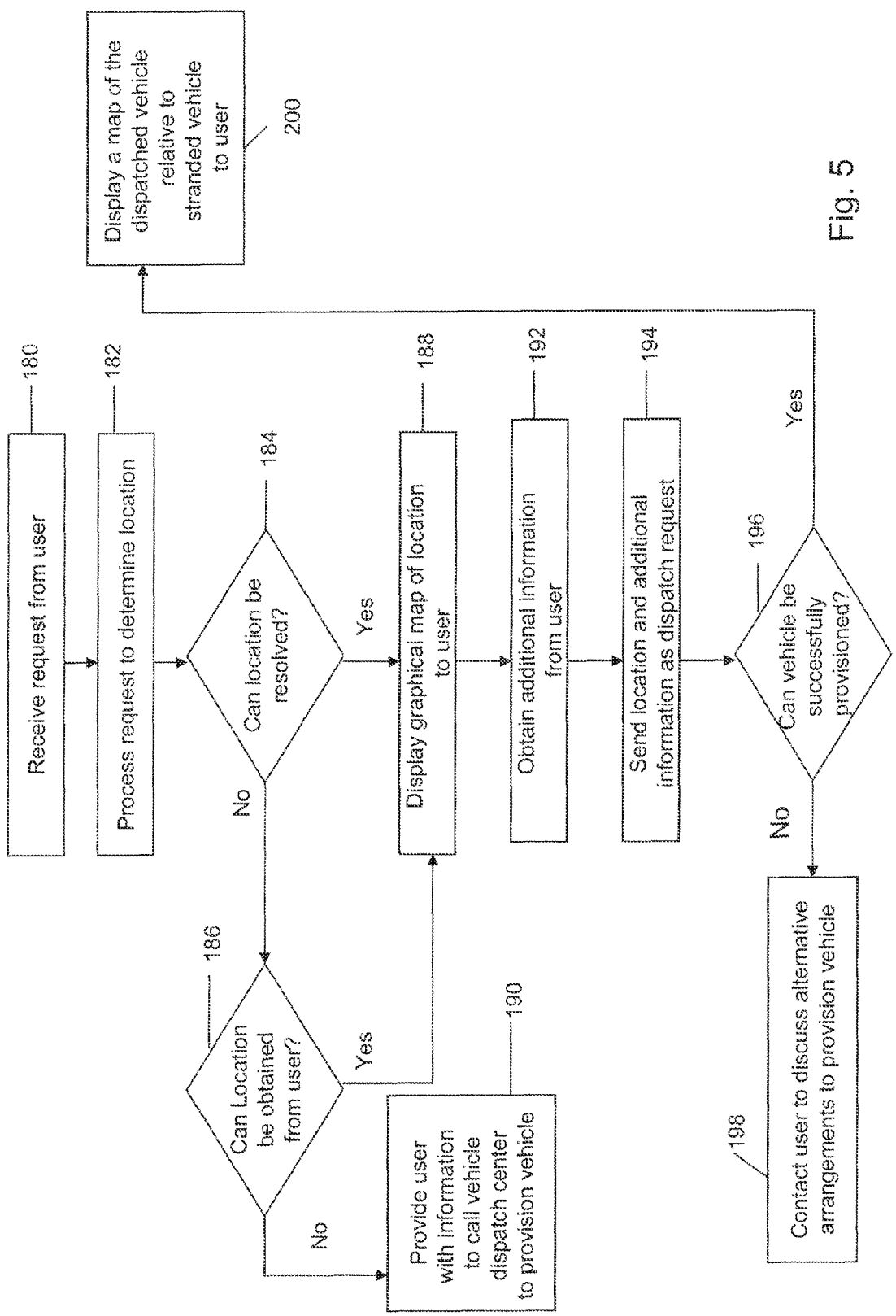
FIG. 5 illustrates an exemplary sequence of operations performed by the components of the automatic roadside assistance system shown in FIG. 1, in accordance with one embodiment of the present invention.

FIG. 5 illustrates an exemplary sequence of operations performed by the components of the automatic roadside assistance system shown in FIG. 1. In operation 180, a request regarding a stranded vehicle is received. In operation 182, the request is processed to determine the location of the stranded vehicle. In operation 184, a check is performed to determine if the location of the stranded vehicle can be resolved. In one embodiment, the web service module 126 includes executable instructions to determine if the location of the stranded vehicle can be resolved. If the location cannot be resolved, then a check 186 is performed to determine if the location of the stranded vehicle can be directly obtained from the user. In one embodiment, the web service module 126 includes executable instructions to determine if the location can be obtained from the user via the mobile web application 116. For example, a GUI may be presented to the user to enter a physical address. Alternately, a user may be presented with a map of the general vicinity and be provided with controls that allows the user to specify a particular location on the map. If the location of the stranded vehicle has been resolved and/or the location of the stranded vehicle has been directly obtained from the user, execution passes to operation 188 to display a graphical map of the location of the stranded vehicle. If the location of the stranded vehicle cannot be resolved and/or the location of the stranded vehicle cannot be directly obtained from the user, then execution passes to operation 190 to provide the user with information to directly contact a service representative in the vehicle dispatch center 158 for provisioning a vehicle to the user. In one embodiment, the information may be provided via the mobile web application 116 to the user by executable instructions in the web service module 126.

In certain embodiments, the web service module 126 may also include executable instructions to determine if the graphical map of the location displayed to the user (in operation 188) is accurate. If the graphical map of the location is not accurate, executable instructions in the web service module 126 determine if the accurate location of the stranded vehicle can be directly obtained from the user. If the accurate location cannot be directly obtained from the user, then executable instructions in the web service module 126 provide the user with information to directly contact a service representative for provisioning a vehicle to the user.

Returning to FIG. 5, in operation 192, additional information regarding the stranded vehicle is obtained from the user. In operation 194, the location of the stranded vehicle and the additional information is sent as a dispatch request to provision a vehicle for the user. In operation 196, a check is performed to determine if a vehicle can be successfully provisioned for the user. In one embodiment, the dispatch request processing module 142 includes executable instructions to determine if a vehicle can be successfully provisioned. For example, following the dispatch request API call, it may be determined that the customer's coverage level is insufficient to cover the cost of dispatching a vehicle or that a dispatched vehicle cannot be provisioned within an acceptable time period. If a vehicle cannot be successfully provisioned, then execution passes to operation 198 wherein executable instructions in the dispatch request processing module 142 provide the vehicle dispatch center 158 with information to directly call the user to discuss alternative arrangements to dispatch a vehicle to the user. If a vehicle can be successfully provisioned, then execution passes to operation 200 to display a map of the location of the GPS-enabled dispatched vehicle relative to the stranded vehicle. It may be noted that in the sequence of operations (180-200) discussed above, a user may elect to call a service representative in the vehicle dispatch center 158 to provision a vehicle for the user, at any point in time.

Those skilled in the art will recognize a number of advantages associated with the disclosed embodiments. The disclosed embodiments enable the provisioning of a vehicle programmatically via software modules that integrate the functionality provided by a vehicle dispatch center with the services provided by a vehicle roadside assistance center. The communication and processing of dispatch requests programmatically via the dispatch request API enables the automatic provisioning of a vehicle to the user. Accordingly, information regarding a provisioned vehicle is automatically displayed on the user's mobile device, without the user having to contact a service representative at a vehicle dispatch center to obtain the information. This results in increased cost savings to the user. In addition, the programmatic display of location updates of a dispatched vehicle relative to a stranded vehicle on the mobile device via the software modules enables the user to view the status of a request in real-time on the mobile device, thereby creating enhanced user experience and satisfaction.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transient computer readable storage medium comprising executable instructions to:
   receive from a mobile device a request regarding a stranded vehicle;
   process the request to determine the location of the stranded vehicle; and
   deliver to the mobile device the location of the stranded vehicle relative to a dispatched vehicle, wherein the executable instructions to deliver include executable instructions to automatically deliver a graphical map of location updates associated with the dispatched vehicle relative to the stranded vehicle.

2. The non-transient computer readable storage medium of claim 1, wherein the request is received via a mobile web application in the mobile device.

3. The non-transient computer readable storage medium of claim 1, wherein the executable instructions to process the request comprise executable instructions to retrieve additional information regarding the stranded vehicle.

4. The non-transient computer readable storage medium of claim 3, wherein the additional information comprises vehicle status information, vehicle coverage information and vehicle insurance policy information.

5. The non-transient computer readable storage medium of claim 3, wherein the executable instructions to process the request further comprise executable instructions to automatically provision the dispatched vehicle to a user based on the additional information and the location of the stranded vehicle.

6. The non-transient computer readable storage medium of claim 1, wherein the executable instructions to deliver include executable instructions to automatically deliver at least one of information from a short message service (SMS) and an email message comprising location updates associated with the dispatched vehicle relative to the stranded vehicle.

7. A non-transient computer readable storage medium comprising executable instructions to:
   receive from a mobile device a request regarding a stranded vehicle;
   process the request to determine the location of the stranded vehicle;
   obtain vehicle insurance policy information for the user of the mobile device;
   perform an evaluation of the vehicle insurance policy information to confirm a coverage level to cover the cost of dispatching a vehicle to the stranded vehicle; and
   selectively dispatch a vehicle to the stranded vehicle based upon the evaluation.

8. The non-transient computer readable storage medium of claim 7 further comprising executable instructions to access a map service.

9. The non-transient computer readable storage medium of claim 8 further comprising executable instructions to deliver to the mobile device the location of the stranded vehicle relative to a dispatched vehicle.

10. The non-transient computer readable storage medium of claim 9 further comprising executable instructions to automatically deliver a graphical map of location updates associated with the dispatched vehicle relative to the stranded vehicle.

* * * * *